United States Patent
Hutton et al.

(10) Patent No.: US 7,971,034 B2
(45) Date of Patent: Jun. 28, 2011

(54) REDUCED OVERHEAD ADDRESS MODE CHANGE MANAGEMENT IN A PIPELINED, RECYCLING MICROPROCESSOR

(75) Inventors: David S. Hutton, Tallahassee, FL (US); Michael Billeci, Tivoli, NY (US); Fadi Y. Busaba, Poughkeepsie, NY (US); Brian R. Prasky, Wappingers Falls, NY (US); John G. Rell, Jr., Saugerties, NY (US); Chung-Lung Kevin Shum, Wappingers Falls, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/051,415

(22) Filed: Mar. 19, 2008

(65) Prior Publication Data
US 2009/0240929 A1 Sep. 24, 2009

(51) Int. Cl.
*G06F 9/00* (2006.01)
*G06F 9/44* (2006.01)
*G06F 9/30* (2006.01)

(52) U.S. Cl. .................................... 712/217; 712/229
(58) Field of Classification Search .................... 712/229
See application file for complete search history.

(56) References Cited

U.S. PATENT DOCUMENTS

| | | | |
|---|---|---|---|
| 5,404,471 A * | 4/1995 | Kawano et al. | 712/207 |
| 5,542,109 A * | 7/1996 | Blomgren et al. | 712/234 |
| 6,442,673 B1 | 8/2002 | Col et al. | |
| 6,877,082 B1 | 4/2005 | Worrell | |
| 7,036,003 B1 | 4/2006 | Sunayama et al. | |
| 7,051,329 B1 * | 5/2006 | Boggs et al. | 718/104 |
| 7,287,152 B2 | 10/2007 | Wilson | |
| 2003/0196077 A1 | 10/2003 | Henry et al. | |
| 2003/0225998 A1 | 12/2003 | Khan et al. | |
| 2005/0033939 A1 | 2/2005 | Dijkstra | |
| 2005/0091471 A1 | 4/2005 | Conner et al. | |
| 2005/0228951 A1 | 10/2005 | Peri et al. | |
| 2007/0143579 A1 | 6/2007 | Shih et al. | |

OTHER PUBLICATIONS

Rychlik et al., "Efficacy and Performance Impact of Value Prediction", Apr. 1998.*

(Continued)

*Primary Examiner* — Alford W Kindred
*Assistant Examiner* — Jesse R Moll
(74) *Attorney, Agent, or Firm* — Cantor Colburn LLP; John Campbell

(57) ABSTRACT

A method, system, and computer program product for reduced overhead address mode change management in a pipelined, recycling microprocessor are provided. The recycling microprocessor includes logic executing thereon. The microprocessor also includes an instruction fetch unit (IFU) supporting computation of address adds in selected address modes and reporting non-equal comparison of the computation to the logic. The microprocessor further includes a fixed point unit determining whether the mode has changed and reporting changes to the logic. Upon determining the comparison yields an equal result but the mode has changed, a recycle event is triggered to ensure subsequent ofetches are relaunched in the correct mode and that no execution writebacks occur from work performed in an incorrect mode. For comparisons yielding a non-equal result and a changed mode, the logic clears bits set in response to the determinations, and a serialization event is taken to reset a corresponding pipeline for operation in the correct mode.

1 Claim, 3 Drawing Sheets

OTHER PUBLICATIONS z/Architecture, Principles of Operation, Sixth Edition, Apr. 2007, Publication No. SA22-7832-05, copyright IBM Corp. 1990-2007, pp. 1-1218.

Martin Schoberl, Pipelining 1, (see p. 20, 30-32), 51 pages, 2007.

E.M. Schwarz, et al., The Microarchitecture of the IBM eServer z900 Processor, IBM J. Res. & Dev., vol. 46, No. 4/5, Jul./Sep. 2002, 15 pages.

Sameh Elsharkaway, CPU Structure and Function, Computer Architecture CSC 391, Nov. 28, 2005, 30 pages.

* cited by examiner

REDUCED OVERHEAD ADDRESS MODE CHANGE MANAGEMENT IN A PIPELINED, RECYCLING MICROPROCESSOR

BACKGROUND OF THE INVENTION

This invention relates generally to address mode change management and, in particular, to a method, system, and computer program product for minimizing unnecessary overhead in address mode change management in a microprocessor.

In a computer architecture that supports multiple addressing modes (e.g. IBM®'s z/Architecture supports three addressing modes—24, 31 and 64-bit), these address modes affect how many effective address bits are used in instruction and operand address calculations.

Address mode (AM) updates need to be visible to instruction fetching (ifetching) and operand fetching (ofetching) for all instructions after the instruction that does the update. The easiest way to effect this is to force a "serialization exceptional condition" (serialize xcond, or xcond) after the AM-changing instruction, which causes the entire pipeline to purge and resume on the immediate-next instruction after the AM-changer. It also forces all outstanding i- and ofetches to be discarded. In addition, Xcond purges are quite costly and aren't always required.

It would be desirable to provide a way to minimize the above-stated performance impact of address mode changes.

BRIEF SUMMARY OF THE INVENTION

The shortcomings of the prior art are overcome and additional advantages are provided through the provisions of our invention.

An exemplary embodiment includes a system for reduced overhead address mode change management in a pipelined, recycling microprocessor. The recycling microprocessor includes logic executing thereon. The microprocessor also includes an instruction fetch unit (IFU) supporting computation of address adds in selected address modes and reporting non-equal comparison of the computation to the logic. The microprocessor further includes a fixed point unit determining whether the mode has changed and reporting changes to the logic. Upon determining the comparison yields an equal result but the mode has changed, a recycle event is triggered to ensure subsequent ofetches are relaunched in the correct mode and that no execution writebacks occur from work performed in an incorrect mode. For comparisons yielding a non-equal result and a changed mode, the logic clears bits set in response to the determinations, and a serialization event is taken to reset a corresponding pipeline for operation in the correct mode.

Other exemplary embodiments include a method and computer program product for reduced overhead address mode change management in a pipelined, recycling microprocessor.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF EXEMPLARY EMBODIMENTS

An exemplary embodiment of the present invention provides reduced overhead address mode change management in a pipelined, recycling microprocessor.

As indicated above, address mode (AM) updates must be visible to instruction fetching (ifetching) and operand fetching (ofetching) for all instructions after the instruction that does the update. Conventionally, one way to accomplish this is to force a "serialization exceptional condition" (serialize xcond, or xcond) after the AM-changing instruction, which causes the entire pipeline to purge and resume on the immediate-next instruction after the AM-changer, and in the updated AM. It also forces all outstanding i- and ofetches to be discarded. As Xcond purges can be quite costly and aren't always required, a better-for-performance solution makes use of simple logic and capitalizes, in part, on a recycling (non-stalling) pipeline.

In an exemplary embodiment, address mode change management processes reduce the aforementioned performance impact resulting from AM changes. Instead of the xcond, which can be quite costly in performance, the address mode change management processes utilize two components: ifetch and ofetch handling. The ifetch mechanism entails selective-rather-than-blind xconding, and the ofetch mechanism substitutes a reject for an xcond.

It will be understood that that "all AM changes" is not to be confused with "execution of all AM-setting instructions." For instance, if a processor is executing in a 31-bit AM and a set address mode 31-bit (SAM31) is encountered, the address mode change management logic of the exemplary embodiments will recognize that no AM change has occurred. This disclosure defines "AM changing instruction" to be an "AM setting instruction that changes the AM value.

Figure 1:
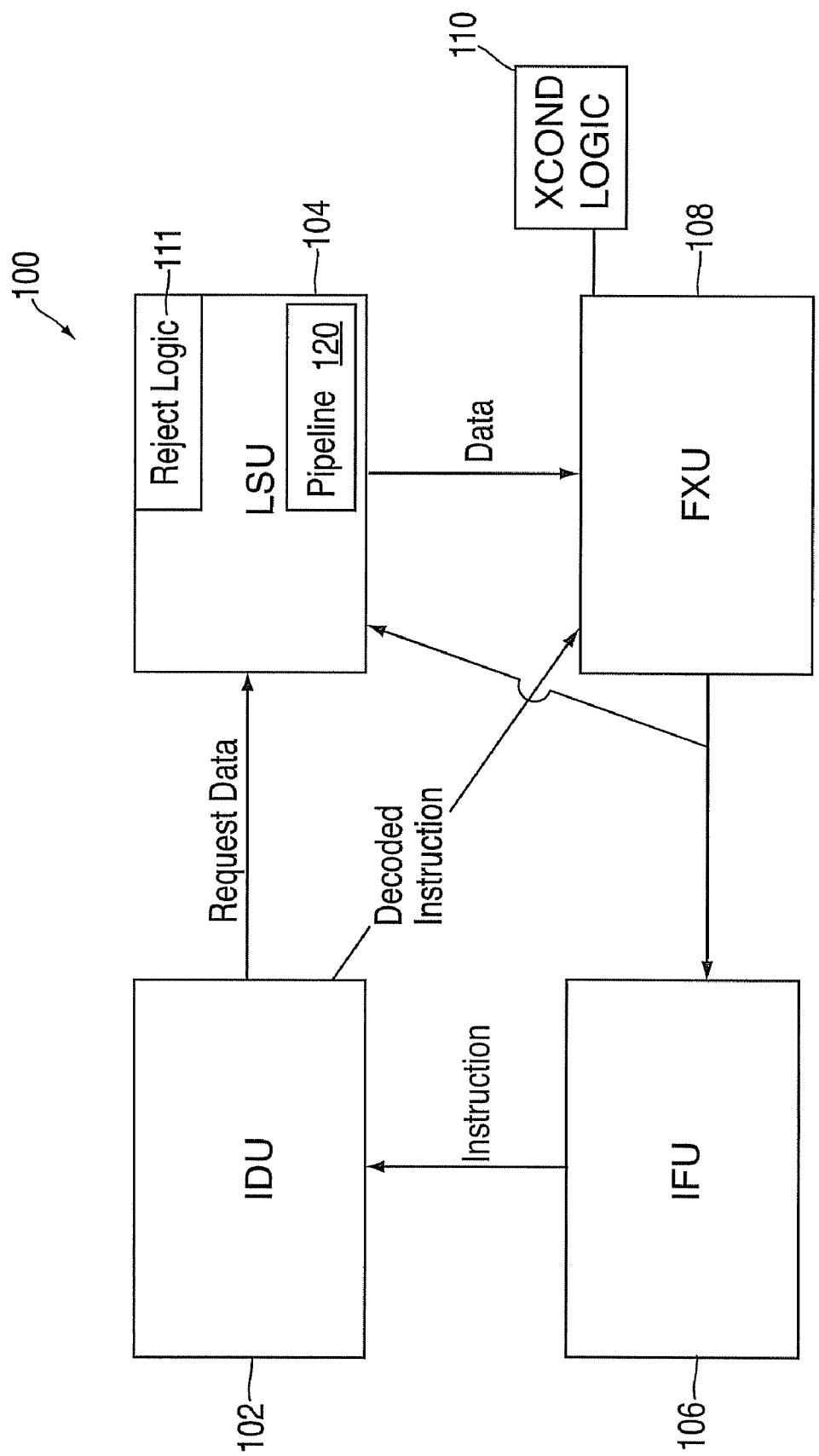
FIG. 1 illustrates a system upon which address mode change management may be implemented in accordance with an exemplary embodiment.

Turning now to FIG. 1, a processor upon which address mode change management may be implemented will now be described in an exemplary embodiment. The processor 100 of FIG. 1 may be, e.g., a microprocessor or a pipelined processor. The functions of the processor 100 may be implemented by hardware and/or software instructions including firmware or microcode. FIG. 1 includes an instruction decode unit (IDU) 102 and a load/store unit (LSU) 104 which contains a local cache (not shown), reject logic 111, and a recycling pipeline 120. Recycling pipelines are often employed in high-frequency designs where there isn't sufficient time to report stalling conditions back to earlier stages in the pipeline. Once any condition that can prevent an instruction from being executed (correctly) is detected on an instruction by the "end of a recycle window" (shown in FIG. 2), a section of the pipeline 120 "recycles," looping all instructions within a "recycle window" back to an earlier stage demarked by the "start of the recycle window." The stall is then effectuated until the recycled instructions are permitted to reenter the pipe when that known condition is resolved or potentially resolved.

The processor 100 also includes an instruction fetch unit (IFU) 106 and a fixed-point unit (FXU) 108. Other units or connections not required to show a typical fixed-point instruction are not shown. The IFU 106 fetches instructions and forwards the instructions to the IDU 102. The IDU 102 decodes instructions and dispatches requests for data associated with one or more dispatched instructions to the LSU 104. The IDU 102 also dispatches one or more of the decoded instructions to the FXU 108, which is in communication with XCOND logic 110. The LSU 104 responds to the data requests and provides the data to the FXU 108. The LSU 104 may include a directory that tracks the ownership state (exclusive ownership, read only, etc.) for each line of data in the cache local to the processor 100. The LSU 104 may also include a store queue that handles storage updates during instruction execution. The store queue will maintain a line exclusive while a store operation is still pending until the store updates are committed to local cache.

The following acronyms are defined below.

"IA" is "instruction address", "AGEN" is "address generation", "ifetch" is "instruction fetch", "icache" is "instruction cache", "dcache" is "data cache", "ofetch" is "operand (or data) fetch", and "WB" is "execution write-back".

Figure 2:
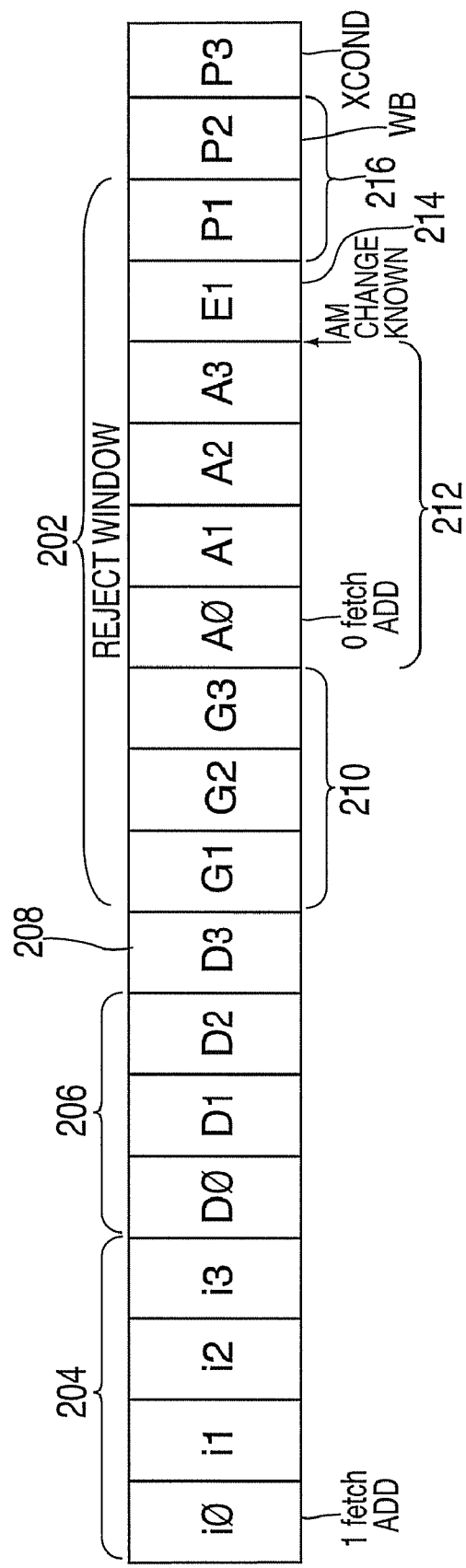
FIG. 2 illustrates a recycling pipeline used in implementing address mode change management in an exemplary embodiment.

FIG. 2 illustrates one example of a recycling pipeline 200, which corresponds to the pipeline 120 of FIG. 1. It will be seen in FIG. 2 the recycling pipeline 200 includes a 9-cycle reject/recycle window 202 between G1 and P1 cycles. "i0 . . i3" are ifetch/icache access stages 204, "D0 . . D2" are decode stages 206, "D3" is also a decode stage 208, which may be a holding tank. A holding tank is used to contain spillover from the D2 stage. "G1 . . G3" are grouping stages 210, "A0 . . A3" are ofetch/dcache access stages 212, "E1" is the FXU's 108 execution cycle 214, and "P . . P2" are putaway stages 218.

Figure 3:
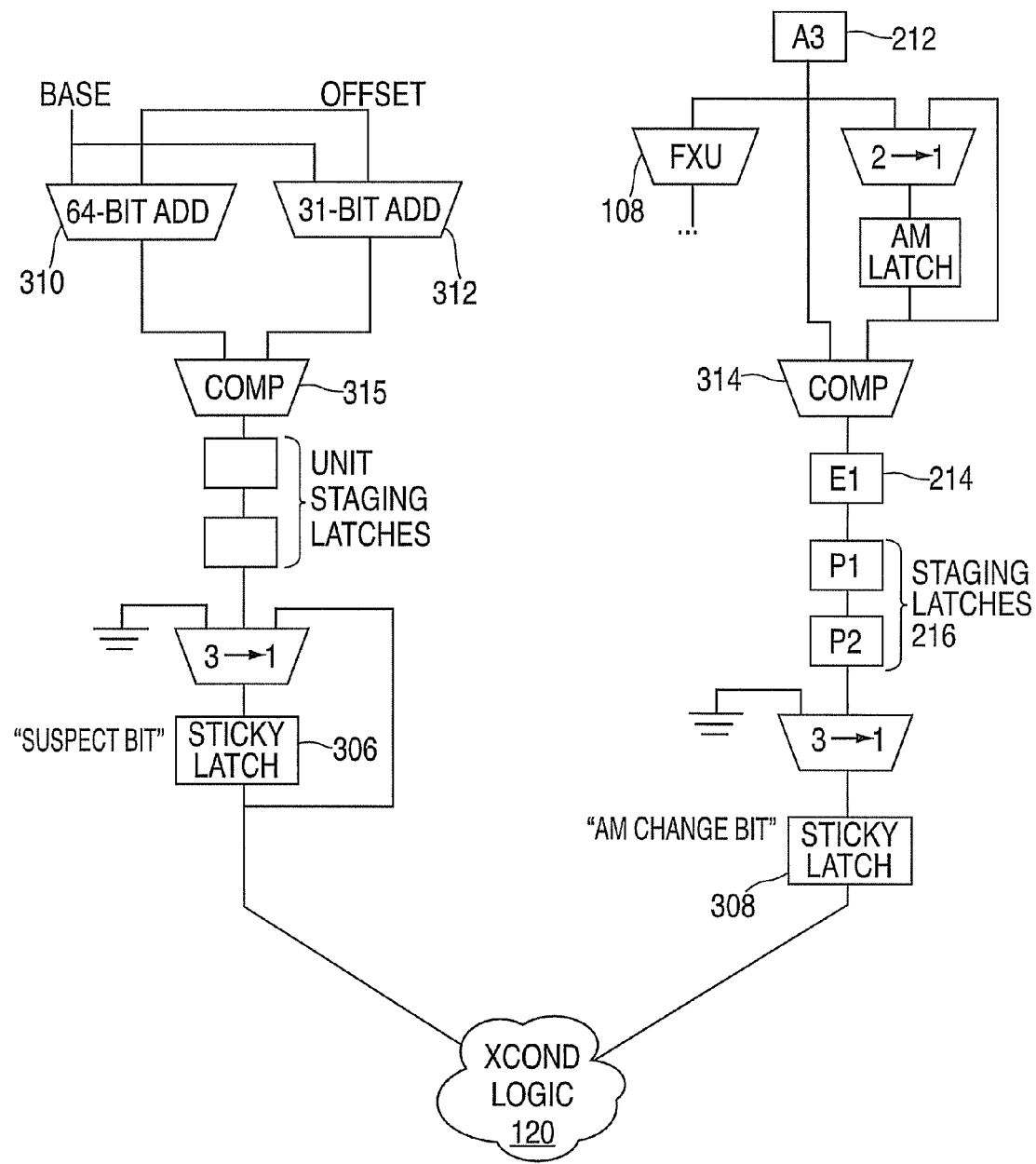
FIG. 3 is a flow diagram including logic components describing an instruction fetch unit's (IFU's) "suspect" indication and a fixed point unit's (FXU's) "AM-change" indication to xcond logic in accordance with an exemplary embodiment.

It will be seen that in FIG. 3, a flow diagram including logic components for implementing address mode change management will now be described in an exemplary embodiment. The diagram of FIG. 3 illustrates how the IFU 106 determines its "suspect" indication how this is presented to xcond logic 110 after holding in a sticky latch. Similarly the "AM-change" indication from the FXU 108 is presented to the xcond logic 110 from the output of a sticky latch. As one example, the address mode change management processes describe AM-change management between 31-and-64-bit modes; however, the address mode change management processes may be readily applied to any quantity or size of AM changes.

Sequential ifetch handling. Multi-workload analysis shows changes in-and-out of 24-bit mode are uncommon; therefore, no special case hardware is in place to optimize for these. All instructions that change in-and-out of 24-bit mode still force an xcond operation afterward. The analysis also shows that even while in 64-bit mode, most instruction addresses still fall within 31-bit AM space (though the same cannot be said for ofetch addresses). So always xconding for sale of ifetch when going in-or-out of 31-or-64-bit modes is unnecessary, and drives the following optimization: if all ifetching addresses, obtained either by sequentially incrementing through a sequential stream, or possibly calculated by detecting a branch and then doing the corresponding address calculation, these IA's are computed in both 64 and 31-bit modes (shown in elements 310 and 312) and, if they differ (via compare logic 315), a sticky "suspect" bit 306 is sent to the xcond logic 110 (near the FXU 108) as soon as it is detected. In a usual processor pipeline, this "suspect" bit 306 indication is be transmitted ahead of the actual instruction text (itext) being used by the FXU 108. If the FXU 108 determines an address mode change in-or-out of 31-or-64-bit modes has occurred (via a compare component 314), it sets a sticky "AM-change" bit 308. If both the "AM-change" and "suspect" bits 306/308 are set, an xcond operation occurs. Whenever an xcond operation occurs for any reason, the sticky "AM-change" and "suspect" bits 306/308 can be cleared, since the IFU 106 will have to restart its fetches from the last confirmed IA which is correctly formed from the current AM.

ofetch handling. As mentioned above, the processor 100 has a recycling pipeline 120/200. The end of the recycle window is after instruction execution and ofetching is completely contained within the recycle window 202. As such, ofetching is able to be precise in rejecting on all actual AM changes. In doing this, all ofetches are ensured to be relaunched in the correct mode (whether they need to or not). Hence, an xcond event may be substituted with a much-less-overhead reject event. Rejecting on all AM-changing events has the added benefit of ensuring no architected register writebacks occur from operand data on subsequent instructions attained in the wrong mode, as described further herein.

Branch handling (special case of ofetch handling). Sometimes the ifetching address may not be formed from the instruction text or from a sequential increment. For example, it may be redirected due to branch target prediction based on known branch prediction techniques. In this instance, there is no calculation and, consequently, the sticky bit 308 will not be involved. Instead, in this processor pipeline 120/200, the actual branch address will be calculated again using the ofetch address generation hardware. As discussed above, if AM changes occur, the subsequent instruction is recycled. The branch agen follows the same mechanism as ofetch and, thus, is generated under the correct AM. The branch AGEN result is sent to the IFU 106 and compared to the prior-predicted IA. If the predicted IA is incorrect due to AM changes, a branch target wrong will be signaled. In this case, the pipeline 120/200 will flush all pending instructions on the wrongly predicted path and resume instruction fetching/processing from the newly generated address.

Technical effects and benefits include a solution which yields higher microprocessor performance and bandwidth when changing between 31-and 64-bit addressing modes. Serialization xconds on z6 cost 22 cycles whereas rejects cost only 9. Our ofetch solution exchanges all AM-change xconds for rejects, and our ifetch solution only requires an xcond after an AM-change when address computations in both modes yield different results.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a generalpurpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A recycling microprocessor supporting more than one instruction-and-operand addressing mode, the recycling microprocessor comprising:

an instruction fetch unit (IFU) for computation of address adds in selected address modes and for reporting non-equal comparison of the computation to logic executing on the recycling microprocessor; and a fixed point unit for determining whether an address mode has changed and for reporting any address mode changes to the logic;

the recycling microprocessor for performing a method comprising:

computing address adds in selected address modes;

comparing the computed address adds to the logic;

triggering a recycling event to ensure subsequent ofetches are relaunched in a correct address mode and that no execution writebacks occur from work performed in an incorrect address mode, in response to determining that the comparison yields an equal result but the address mode has changed; and clearing bits respectively set in response to the determinations, and resetting, via a serialization event, a corresponding pipeline for operation in the correct address mode, in response to determining that the comparison yields an non-equal result but the address mode has changed.

* * * * *